United States Patent
Zhou et al.

(10) Patent No.: US 12,052,595 B2
(45) Date of Patent: Jul. 30, 2024

(54) RESOURCE COUNTING RULE FOR DETERMINING MAXIMUM MEASURED REFERENCE SIGNALS

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 17/452,901

(22) Filed: Oct. 29, 2021

(65) Prior Publication Data

US 2022/0141695 A1    May 5, 2022

Related U.S. Application Data

(60) Provisional application No. 63/198,647, filed on Nov. 1, 2020.

(51) Int. Cl.
| | |
|---|---|
| *H04W 24/10* | (2009.01) |
| *H04B 7/06* | (2006.01) |
| *H04W 28/02* | (2009.01) |
| *H04W 72/51* | (2023.01) |

(52) U.S. Cl.
CPC .......... *H04W 24/10* (2013.01); *H04B 7/0639* (2013.01); *H04W 28/0215* (2013.01); *H04W 72/51* (2023.01)

(58) Field of Classification Search
CPC . H04W 24/10; H04W 28/0215; H04W 72/51; H04B 7/0639
See application file for complete search history.

(56) References Cited

U.S. PATENT DOCUMENTS

| | | | |
|---|---|---|---|
| 2019/0261345 A1* | 8/2019 | Shi | ..................... H04W 72/046 |
| 2022/0225337 A1* | 7/2022 | Fan | ........................ H04B 17/24 |
| 2023/0224747 A1* | 7/2023 | Xu | .......................... H04W 8/22 370/329 |

* cited by examiner

*Primary Examiner* — Natasha W Cosme
*Assistant Examiner* — Yewon Kim
(74) *Attorney, Agent, or Firm* — Harrity & Harrity, LLP

(57) ABSTRACT

Various aspects of the present disclosure generally relate to wireless communication. In some aspects, a user equipment (UE) may determine a supported maximum total number of measurement resources configured to measure within a slot based at least in part on a rule, wherein the rule indicates how to count a measurement resource configured for multiple measurement usages. The UE may transmit capability information identifying the supported maximum total number of measurement resources. The UE may receive, based at least in part on the capability information and the rule, one or more measurement configurations. Numerous other aspects are provided.

30 Claims, 8 Drawing Sheets

RESOURCE COUNTING RULE FOR DETERMINING MAXIMUM MEASURED REFERENCE SIGNALS

CROSS-REFERENCE TO RELATED APPLICATION

This Patent Application claims priority to U.S. Provisional Patent Application No. 63/198,647, filed on Nov. 1, 2020, entitled "RESOURCE COUNTING RULE FOR DETERMINING MAXIMUM MEASURED REFERENCE SIGNALS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for a resource counting rule for determining maximum measured reference signals.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting capability information identifying a supported maximum total number of measurement resources configured to measure within a slot based at least in part on a rule, wherein the rule indicates how to count a measurement resource configured for multiple measurement usages. The method may include receiving, based at least in part on the capability information and the rule, one or more measurement configurations.

Some aspects described herein relate to a method of wireless communication performed by a base station. The method may include receiving, from a user equipment (UE), capability information identifying a supported maximum total number of measurement resources configured to measure within a slot. The method may include transmitting, based at least in part on a rule and the capability information, one or more measurement configurations for the UE, wherein the rule indicates how to count a measurement resource configured for multiple measurement usages.

Some aspects described herein relate to a user equipment (UE) for wireless communication. The user equipment may include a memory and one or more processors coupled to the memory. The one or more processors may be configured to transmit capability information identifying a supported maximum total number of measurement resources configured to measure within a slot based at least in part on a rule, wherein the rule indicates how to count a measurement resource configured for multiple measurement usages. The one or more processors may be configured to receive, based at least in part on the capability information and the rule, one or more measurement configurations.

Some aspects described herein relate to a base station for wireless communication. The base station may include a memory and one or more processors coupled to the memory. The one or more processors may be configured to receive, from a user equipment (UE), capability information identifying a supported maximum total number of measurement resources configured to measure within a slot.

Some aspects described herein relate to a non-transitory computer-readable medium that stores a set of instructions for wireless communication by a user equipment (UE). The set of instructions, when executed by one or more processors of the UE, may cause the UE to transmit capability information identifying a supported maximum total number of measurement resources configured to measure within a slot based at least in part on a rule, wherein the rule indicates how to count a measurement resource configured for multiple measurement usages. The set of instructions, when executed by one or more processors of the UE, may cause the UE to receive, based at least in part on the capability information and the rule, one or more measurement configurations.

Some aspects described herein relate to a non-transitory computer-readable medium that stores a set of instructions for wireless communication by a base station. The set of instructions, when executed by one or more processors of the base station, may cause the base station to receive, from a user equipment (UE), capability information identifying a supported maximum total number of measurement resources configured to measure within a slot. The set of instructions, when executed by one or more processors of the base station, may cause the base station to transmit, based at least in part on a rule and the capability information, one or more measurement configurations for the UE, wherein the rule indicates how to count a measurement resource configured for multiple measurement usages.

Some aspects described herein relate to an apparatus for wireless communication. The apparatus may include means for transmitting capability information identifying a supported maximum total number of measurement resources configured to measure within a slot based at least in part on a rule, wherein the rule indicates how to count a measurement resource configured for multiple measurement usages. The apparatus may include means for receiving, based at least in part on the capability information and the rule, one or more measurement configurations.

Some aspects described herein relate to an apparatus for wireless communication. The apparatus may include means for receiving, from a user equipment (UE), capability information identifying a supported maximum total number of measurement resources configured to measure within a slot. The apparatus may include means for transmitting, based at least in part on a rule and the capability information, one or more measurement configurations for the UE, wherein the rule indicates how to count a measurement resource configured for multiple measurement usages.

In some aspects, a method of wireless communication performed by a user equipment (UE) includes determining a supported maximum total number of measurement resources configured to measure within a slot based at least in part on a rule, wherein the rule indicates how to count a measurement resource configured for multiple measurement usages; transmitting capability information identifying the supported maximum total number of measurement resources; and receiving, based at least in part on the capability information and the rule, one or more measurement configurations.

In some aspects, a method of wireless communication performed by a base station includes receiving, from a UE, capability information identifying a supported maximum total number of measurement resources configured to measure within a slot, processing the capability information based at least in part on a rule, wherein the rule indicates how to count a measurement resource configured for multiple measurement usages; processing the capability information based at least in part on a rule, wherein the rule indicates how to count a measurement resource configured for multiple measurement usages; and transmitting, based at least in part on the capability information, one or more measurement configurations for the UE.

In some aspects, a UE for wireless communication includes a memory and one or more processors coupled to the memory, the memory and the one or more processors configured to: determine a supported maximum total number of measurement resources configured to measure within a slot based at least in part on a rule, wherein the rule indicates how to count a measurement resource configured for multiple measurement usages; transmit capability information identifying the supported maximum total number of measurement resources; and receive, based at least in part on the capability information and the rule, one or more measurement configurations.

In some aspects, a base station for wireless communication includes a memory; and one or more processors coupled to the memory, the memory and the one or more processors configured to: receive, from a UE, capability information identifying a supported maximum total number of measurement resources configured to measure within a slot, process the capability information based at least in part on a rule, wherein the rule indicates how to count a measurement resource configured for multiple measurement usages; process the capability information based at least in part on a rule, wherein the rule indicates how to count a measurement resource configured for multiple measurement usages; and transmit, based at least in part on the capability information, one or more measurement configurations for the UE.

In some aspects, a non-transitory computer-readable medium storing a set of instructions for wireless communication includes one or more instructions that, when executed by one or more processors of a UE, cause the UE to: determine a supported maximum total number of measurement resources configured to measure within a slot based at least in part on a rule, wherein the rule indicates how to count a measurement resource configured for multiple measurement usages; transmit capability information identifying the supported maximum total number of measurement resources; and receive, based at least in part on the capability information and the rule, one or more measurement configurations.

In some aspects, a non-transitory computer-readable medium storing a set of instructions for wireless communication includes one or more instructions that, when executed by one or more processors of a base station, cause the base station to: receive, from a UE, capability information identifying a supported maximum total number of measurement resources configured to measure within a slot, process the capability information based at least in part on a rule, wherein the rule indicates how to count a measurement resource configured for multiple measurement usages; process the capability information based at least in part on a rule, wherein the rule indicates how to count a measurement resource configured for multiple measurement usages; and transmit, based at least in part on the capability information, one or more measurement configurations for the UE.

In some aspects, an apparatus for wireless communication includes means for determining a supported maximum total number of measurement resources configured to measure within a slot based at least in part on a rule, wherein the rule indicates how to count a measurement resource configured for multiple measurement usages; means for transmitting capability information identifying the supported maximum total number of measurement resources; and means for receiving, based at least in part on the capability information and the rule, one or more measurement configurations.

In some aspects, an apparatus for wireless communication includes means for receiving, from a UE, capability information identifying a supported maximum total number of measurement resources configured to measure within a slot, means for processing the capability information based at least in part on a rule, wherein the rule indicates how to count a measurement resource configured for multiple measurement usages; means for processing the capability information based at least in part on a rule, wherein the rule indicates how to count a measurement resource configured for multiple measurement usages; and means for transmitting, based at least in part on the capability information, one or more measurement configurations for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
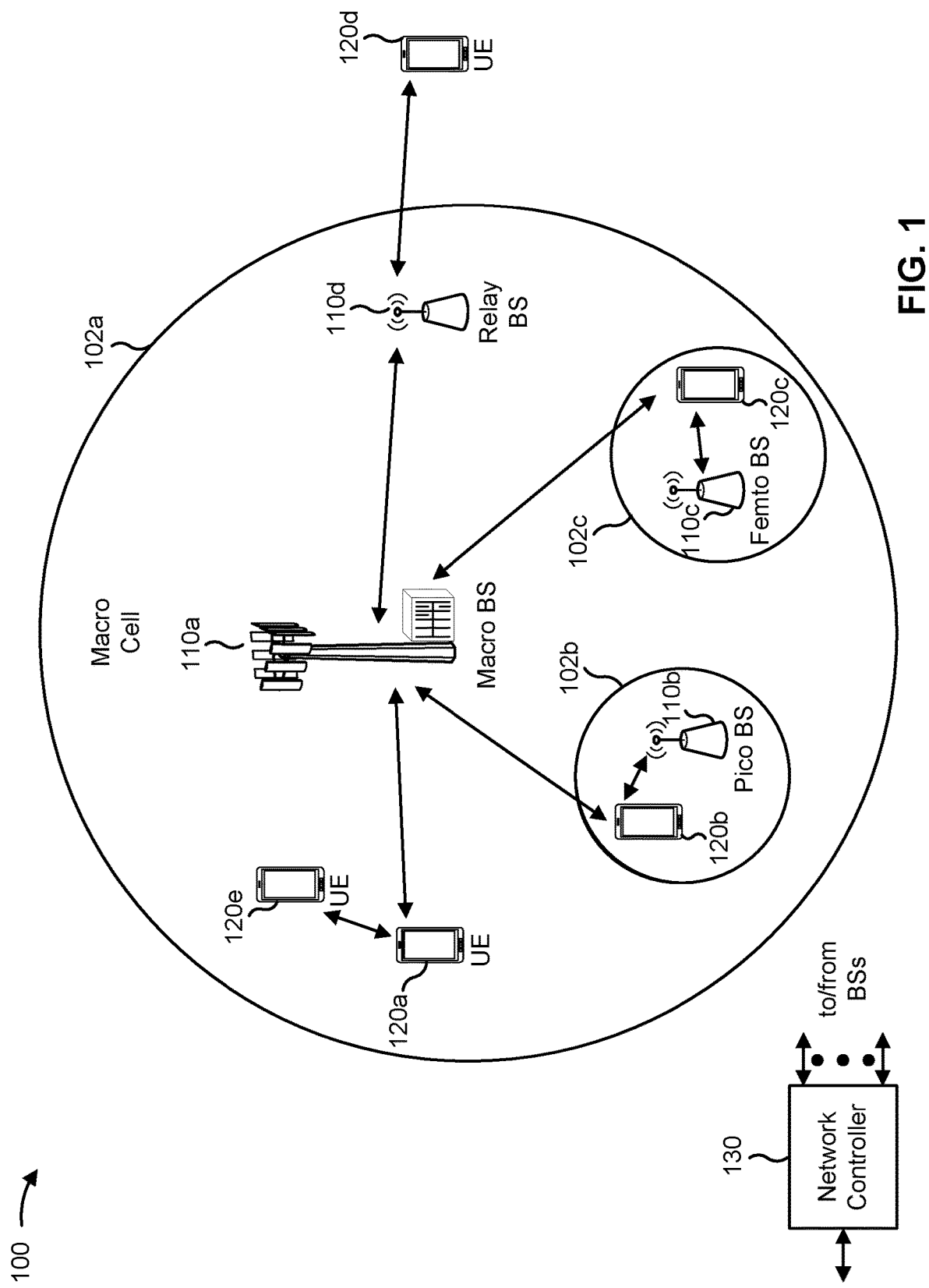
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz–300 GHz) which is identified by the International Telecommunications Union (ITU) as a "millimeter wave" band. Thus, unless specifically stated otherwise, it should be understood that the term "sub-6

GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
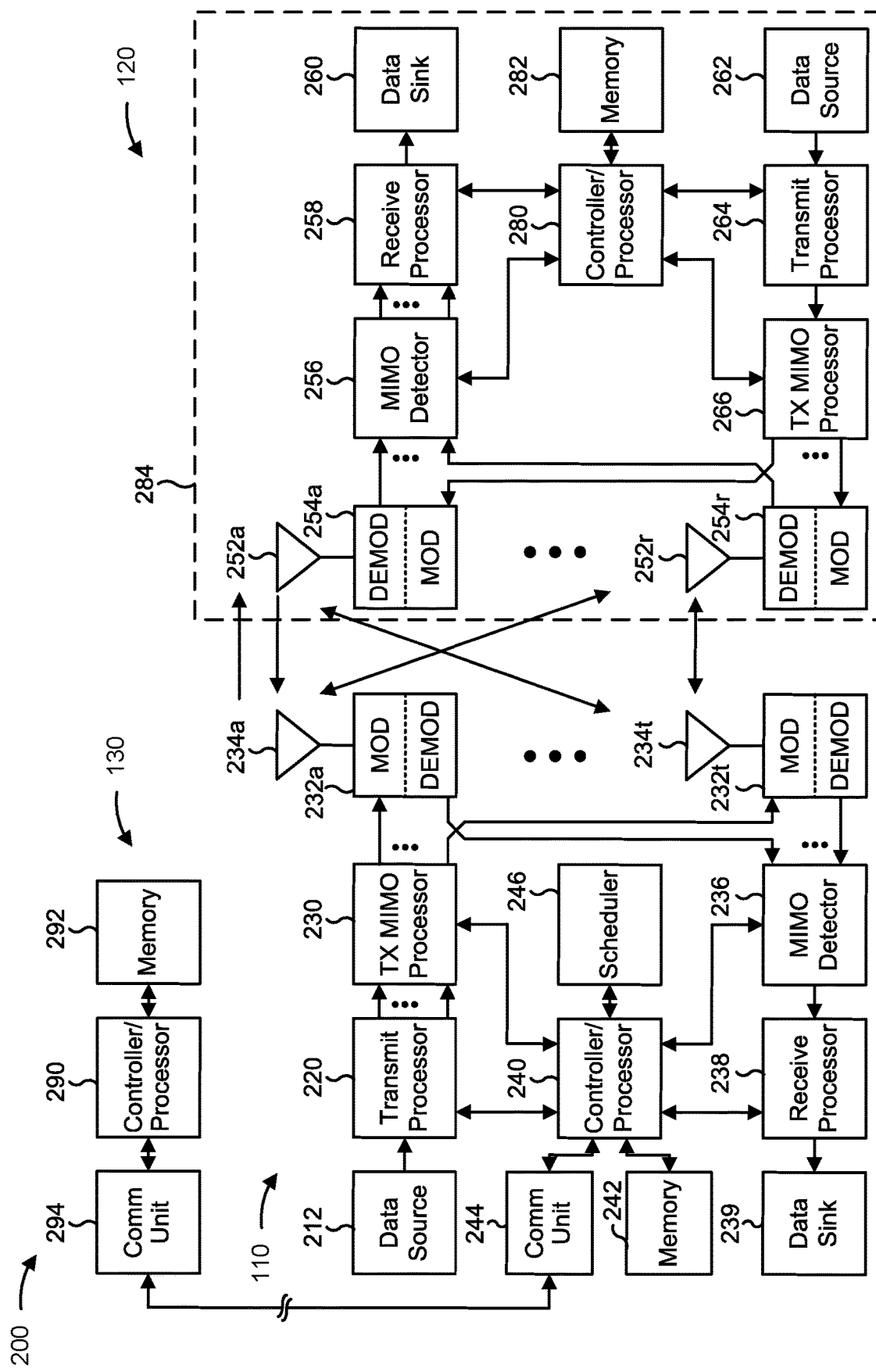
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with resource counting for determining maximum measured reference signals, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for determining a supported maximum total number of measurement resources configured to measure within a slot based at least in part on a rule, wherein the rule indicates how to count a measurement resource configured for multiple measurement usages; means for transmitting capability information identifying the supported maximum total number of measurement resources; and/or means for receiving, based at least in part on the capability information and the rule, one or more measurement configurations. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining the supported maximum total number of measurement resources configured to measure within the slot based at least in part on unique resource identifiers, wherein each of the measurement resources is associated with a unique resource identifier.

In some aspects, the UE includes means for determining the supported maximum total number of measurement resources configured to measure within the slot based at least in part on unique resource occurrences, wherein each of the measurement resources is associated with a unique resource occurrence.

In some aspects, the UE includes means for determining the supported maximum total number of measurement resources configured to measure within the slot across all component carriers in a frequency range usable by the UE.

In some aspects, the UE includes means for determining the supported maximum total number of measurement resources configured to measure within the slot across all component carriers in all frequency ranges usable by the UE.

In some aspects, the base station includes means for receiving, from a UE, capability information identifying a supported maximum total number of measurement resources configured to measure within a slot, means for processing the capability information based at least in part on a rule, wherein the rule indicates how to count a measurement resource configured for multiple measurement usages; and/or means for transmitting, based at least in part on the capability information, one or more measurement configurations for the UE. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
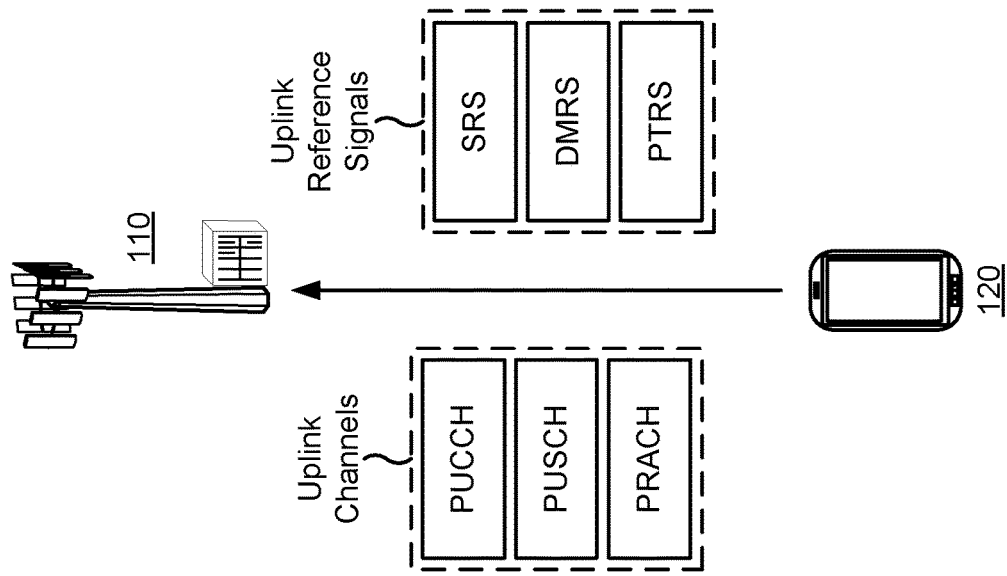
FIG. 3 is a diagram illustrating an example 300 of physical channels and reference signals in a wireless network, in accordance with the present disclosure.
Figure 3:
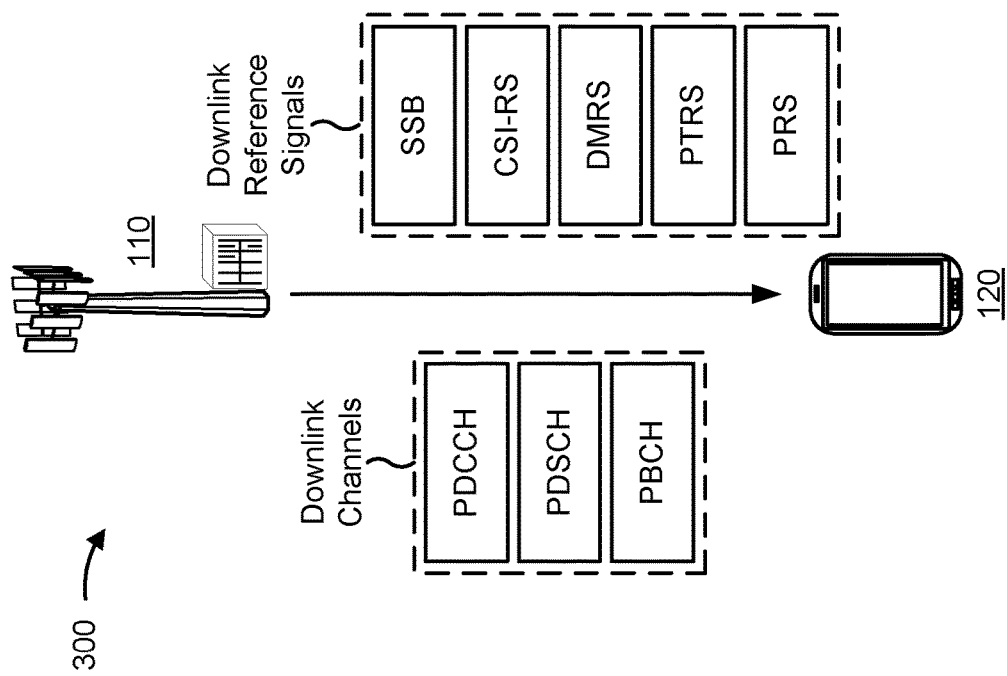

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples. In some aspects, a CSI-RS resource may be reserved for interference measurement. A CSI-RS resource reserved for interference measurement (IM) may be referred to as a CSI-IM.

The UE 120 may be configured to perform measurements with regard to measurement resources. A measurement resource is a resource where a reference signal (e.g., an SSB, a CSI-RS, or the like) is expected. Examples of measurement resources include SSB resources, CSI-RS resources, and CSI-IM resources. Examples of measurement usages that can be performed for a measurement resource include Layer 1 reference signal received power (L1-RSRP), Layer 1 signal to interference plus noise ratio (L1-SINR), pathloss measurement, beam failure detection (BFD), radio link monitoring (RLM), and new beam identification. In some cases, the same measurement resource may be configured for multiple measurement usages. For example, the same CSI-RS resource may be configured for both BFD and L1-RSRP measurements, which are two different measurement usages. In some aspects, a measurement usage may be referred to as a measurement purpose. Some measurement usages are associated with CSI reporting settings (e.g., L1-RSRP, L1-SINR), whereas other measurement usages are not associated with CSI reporting settings (e.g., BFD, RLM). A CSI reporting setting, if configured for a measurement resource, may identify how the UE is to measure and report CSI determined based at least in part on the measurement resource. For example, the CSI reporting setting may indicate a CSI-resource configuration identifier, a report configuration type (e.g. periodic (with a periodicity), semi-persistent, aperiodic reporting), a report quantity (e.g., L1-SINR, L1-RSRP, CQI, RI, PMI, etc.), or the like.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

A UE may report capability information regarding various capabilities of the UE. A base station may use the capability information to configure the UE such that the capabilities of the UE are utilized without being exceeded. One example of a UE capability is a maximum total number of measurement resources supported by the UE in a given slot. For example, the UE may report a supported maximum total number of SSB/CSI-RS/CSI-IM resources configured to measure within a slot across all component carriers (CCs) for any of L1-RSRP measurement, L1-SINR measurement, pathloss measurement, BFD, RLM, and new beam identification. As another example, the UE may report the maximum total number of SSB/CSI-RS/CSI-IM resources configured across all CCs in one frequency range for any of L1-RSRP measurement, L1-SINR measurement, pathloss measurement, BFD, RLM, and new beam identification. The group of all CCs can be in only FR1, only FR2, or both FR1 and FR2. The UE may count the maximum total number of SSB/CSI-RS/CSI-IM resources, and may report the counted value as part of UE capability information.

In some situations, a measurement resource can be configured for multiple measurement usages. For example, the same CSI-RS resource may be configured for BFD and for L1-RSRP measurements, which are two different measurement usages. In this case, it may be unclear how a measurement resource that is configured for multiple measurement usages should be counted for the purpose of signaling the supported maximum total number of SSB/CSI-RS/CSI-IM resources configured to measure within a slot across all CCs. For example, if the same CSI-RS resource is configured for both BFD and L1-RSRP measurements, it may be unclear whether the same CSI-RS resource should be counted once or twice when determining the UE capability on maximum total number of resources configured to measure per slot. If there is a mismatch between how the UE counts the measurement resources and how the BS interprets the UE capability information indicating the maximum total number of measurement resources supported by the UE in a given slot, the BS may either fail to fully utilize the UE's capabilities, or provide the UE with measurement configurations that are beyond the UE's capabilities. Thus, ambiguity in how a measurement resource is counted when configured for multiple measurement usages can lead to inefficient resource allocation and incompatible UE configuration.

Some techniques and apparatuses described herein provide determination of a supported maximum total number of measurement resources configured to measure within a slot based at least in part on a rule, wherein the rule indicates how to count a measurement resource configured for multiple measurement usages (e.g., multiple measurement purposes). In some aspects, the rule indicates to count the measurement resource once, irrespective of how many measurement usages are configured for the measurement resource. In some aspects, the rule indicates to count the measurement resource once per measurement usage configured for the measurement resource. In some aspects, the rule indicates to count the measurement resource once for all measurement usages that are not associated with a configured channel state information report setting, and once per measurement usage that is associated with a configured channel state information report setting. In some aspects, the rule indicates to count the measurement resource once per measurement usage that is not associated with a configured channel state information report setting, and once for all measurement usages that are associated with a configured channel state information report setting. The UE may determine capability information based at least in part on the rule, and may transmit the capability information to a base station. The base station may interpret the received capability information based at least in part on the rule, and may configure the UE with one or more measurement configurations based at least in part on the capability information and the rule. In this way, ambiguity in how a measurement resource is counted when configured for multiple measurement usages is eliminated, thus improving efficiency of resource allocation and reducing the likelihood of incompatible UE configuration.

Figure 4:
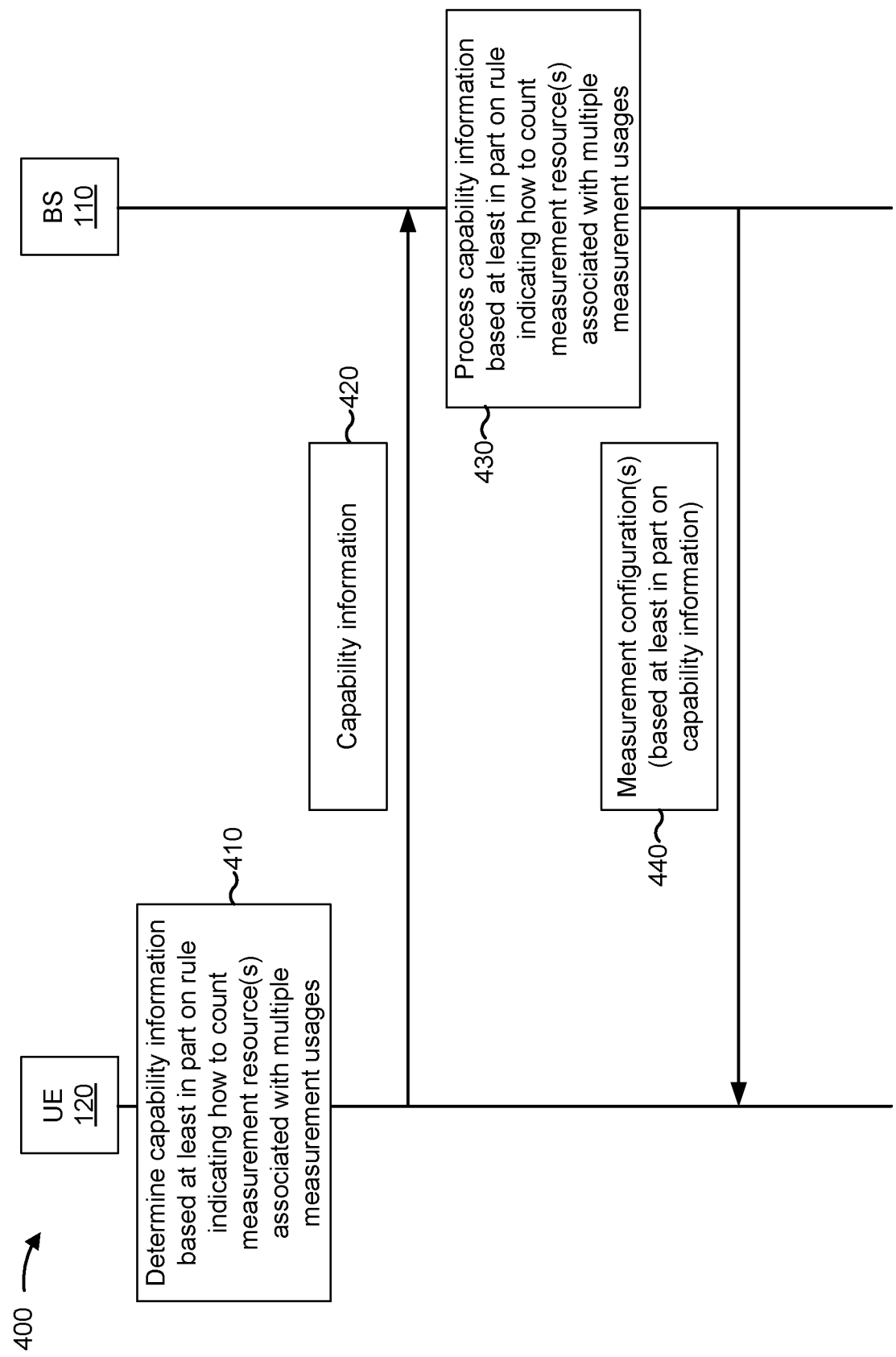
FIG. 4 is a diagram illustrating an example of determination of a supported maximum total number of measurement resources configured to measure within a slot based at least in part on a rule, wherein the rule indicates how to count a measurement resource configured for multiple measurement usages, in accordance with the present disclosure.

FIG. 4 is a diagram illustrating an example 400 of determination of a supported maximum total number of measurement resources configured to measure within a slot based at least in part on a rule, wherein the rule indicates how to count a measurement resource configured for multiple measurement usages, in accordance with the present disclosure. As shown, example 400 includes a UE 120 and a BS 110.

As shown in FIG. 4, and by reference number 410, the UE 120 may determine capability information. Capability information indicates capabilities of the UE 120. For example, the UE 120 may provide UE capability information to the BS 110 in an uplink radio resource control (RRC) message. The BS 110 may use the UE capability information to manage operation of the UE 120 and/or other UEs 120 in wireless network 100. In example 400, the UE 120 determines capability information relating to a maximum number of measurement resources supported by the UE 120 in a slot.

For example, the UE 120 may count a supported maximum total number of measurement resources configured to measure within a slot, such as a supported maximum total number of SSB/CSI-RS/CSI-IM resources configured to measure within a slot across all component carriers (CCs) for any of L1-RSRP measurement, L1-SINR measurement, pathloss measurement, beam failure detection (BFD), radio link monitoring (RLM) and new beam identification. In some aspects, the UE 120 may determine the supported maximum total number of measurement resources for a single frequency range (e.g., FR1 or FR2). In some aspects, the UE 120 may determine the supported maximum total number of measurement resources across multiple frequency ranges (e.g., FR1 and FR2), such as across all frequency ranges supported by the UE 120.

As shown, the UE 120 may determine the supported maximum total number of measurement resources based at least in part on a rule. The rule may indicate how to count a measurement resource configured for multiple measurement usages. For example, in some situations, a same measurement resource can be configured for multiple measurement usages (e.g., the same CSI-RS resource could be configured for both BFD and L1-RSRP measurements, though other examples can also occur). The rule may indicate whether the same measurement resource is to be counted once for all measurement usages (e.g., the CSI-RS resource is to be counted a total of once across all BFD and L1-RSRP measurement usages), once per measurement usage (e.g., the CSI-RS resource is to be counted once for the BFD measurement usage and once for the L1-RSRP measurement usage), or another way.

In some aspects, the rule indicates to count the measurement resource once for all measurement usages configured for the measurement resource. This is referred to herein as Option 1. In this case, the UE may count each resource only once, regardless of how many measurement usages each resource has been configured for. For example, if the same CSI-RS resource is configured for both BFD and L1-RSRP, the measurement resource may be counted only once. As another example, if a CSI-RS resource is configured for BFD and for RLM, the CSI-RS resource may be counted as one resource.

In some aspects, the rule indicates to count the measurement resource once per measurement usage configured for the measurement resource. This is referred to herein as Option 2. In this case, the UE 120 may count each resource once per measurement usage. For example, if the same CSI-RS resource is configured for both BFD and L1-RSRP, the CSI-RS resource may be counted twice. As another example, for a CSI-RS resource configured for L1-SINR, the CSI-RS resource may be counted once for each CSI reporting setting associated with L1-SINR configured for the CSI-RS resource.

In some aspects, rule indicates to count the measurement resource once for all measurement usages that are not associated with a configured channel state information report setting, and once per measurement usage that is associated with a configured channel state information report setting. This is referred to herein as Option 3. In this case, the UE 120 may count each measurement resource once for all measurement usages without a configured CSI reporting setting, and once per measurement usage with a configured CSI reporting setting. For example, if the same CSI-RS resource is configured for BFD, RLM, L1-RSRP, and L1-SINR, the CSI-RS resource may be counted three times: a total of once for both BFD and RLM (since the measurement usages for BFD and RLM measurement do not require a CSI reporting setting to be configured) and a total of twice for L1-RSRP and L1-SINR (since the measurement usages for L1-RSRP and L1-SINR measurement require a CSI reporting setting to be configured).

In some aspects, the rule indicates to count the measurement resource once per measurement usage that is not associated with a configured channel state information report setting, and once for all measurement usages that are associated with a configured channel state information report setting. This is referred to herein as Option 4. In this case, the UE 120 may count each resource once per measurement usage without configured CSI reporting setting, and once per measurement usage with configured CSI reporting setting. For example, if the same CSI-RS resource is configured for BFD, RLM, L1-RSRP, and L1-SINR, the CSI-RS resource may be counted four times: a total of twice for BFD and RLM (where the usages for BFD and RLM measurement do not require CSI reporting setting to be configured) and twice for L1-RSRP and L1-SINR (where the measurement usages for L1-RSRP and L1-SINR measurement require a CSI reporting setting to be configured).

It should be understood that the above-described options can be combined. For example, the rule may indicate to count a measurement resource configured for a first set of measurement usages (such as BFD and RLM) once. The rule may further indicate to count the measurement resource once more if the measurement resource is configured for a second set of measurement usages (such as new beam identification, pathloss reference signaling, or L1-RSRP). The rule may further indicate to count the measurement resource once for each of a third set of measurement usages configured for the measurement resource (such as L1-SINR).

In some aspects, the UE 120 may determine the capability information based at least in part on unique resource identifiers of the measurement resources. For example, each counted resource may correspond to a unique resource identifier. A unique resource identifier is any information used to uniquely identify a resource. In one example, a CSI-RS resource can be identified by a CSI-RS resource set and an identifier within the CSI-RS resource set. In this example, the UE may count each resource associated with a unique resource identifier in accordance with the rule, as described above.

In some aspects, the UE may determine the capability information based at least in part on unique resource occurrences (e.g., unique resource occasions) of the measurement resources. "Resource occurrence" refers to a time and frequency allocation of a resource. For example, if two measurement resources have different time allocations and/or different frequency allocations (e.g., two different symbols), the two measurement resources may include two unique measurement resources. If two measurement resources are associated with the same time allocation and the same frequency allocation, the two measurement resources may include only one unique measurement resource. In this example, the UE 120 may count each resource associated with a unique resource occurrence in accordance with the rule, as described above. In this option, two different resource occurrences with the same resource identifier in one slot are regarded as two resources in Options 1, 2, 3 and 4.

As shown by reference number 420, the UE 120 may transmit the capability information. For example, the UE 120 may transmit the capability information identifying the supported maximum total number of measurement resources, as determined in accordance with the rule. As shown by reference number 430, the BS 110 may process the capability information based at least in part on the rule. For example, the BS 110 and the UE 120 may be preconfigured with the rule (e.g., based at least in part on the rule being specified in a wireless communication specification). As another example, the BS 110 may configure the UE 120 with the rule (e.g., may transmit information indicating the rule). Thus, the BS 110 may use the rule to interpret the capability information. For example, the BS 110 may determine whether a number of measurement resources indicated by the capability information is determined based at least in part on counting resources with multiple configured measurement usages once or multiple times. Thus, ambiguity in how the BS 110 interprets the capability information is eliminated in the case of counting resources with multiple configured measurement usages, thereby reducing the likelihood of incompatible configuration of the UE 120 and improving utilization of UE and network resources.

As shown by reference number 440, the BS 110 may transmit one or more measurement configurations for the UE 120. For example, the BS 110 may transmit configuration information to the UE 120 indicating the one or more measurement configurations. In some aspects, the one or more measurement configurations may be based at least in part on the rule. For example, the one or more measurement configurations may indicate one or more measurement usages, and may link the one or more measurement usages to one or more measurement resources. The one or more measurement configurations may conform to the capability information provided by the UE 120. For example, the one or more measurement configurations may satisfy a per-slot limitation on the UE 120's capabilities, as described above.

A measurement configuration is a configuration provided from the BS 110 to the UE 120 to configure the UE 120 to perform NR measurements, inter radio access technology measurements of Evolved Universal Mobile Telecommunications System (UMTS) Terrestrial Radio Access (E-UTRA) frequencies, or the like. The measurement configuration may configure the UE 120 to report measurement information based at least in part on measurement resources such as SSBs, CSI-RS resources, CSI-IM resources, or the like. The measurement configuration may include measurement objects, reporting configurations, measurement identities, quantity configurations, measurement gap configurations, or a combination thereof. A measurement object may provide a list of objects on which the UE 120 may perform the measurements for intra-frequency and inter-frequency. A reporting configuration may indicate a reporting criterion, a reference signal type, and/or a reporting format for a measurement object. A measurement identity may link a measurement object with a reporting configuration. A quantity configuration may describe filter coefficients for Layer 3 filtering of the measurements. A measurement gap configuration may indicate a gap in which the UE 120 is to perform a measurement. In some aspects, the UE 120 may determine measurement information based at least in part on the one or more measurement configurations (not shown) and/or may report the measurement information based at least in part on the one or more measurement configurations (also not shown).

As indicated above, FIG. 4 is provided as an example. Other examples may differ from what is described with regard to FIG. 5.

Figure 5:
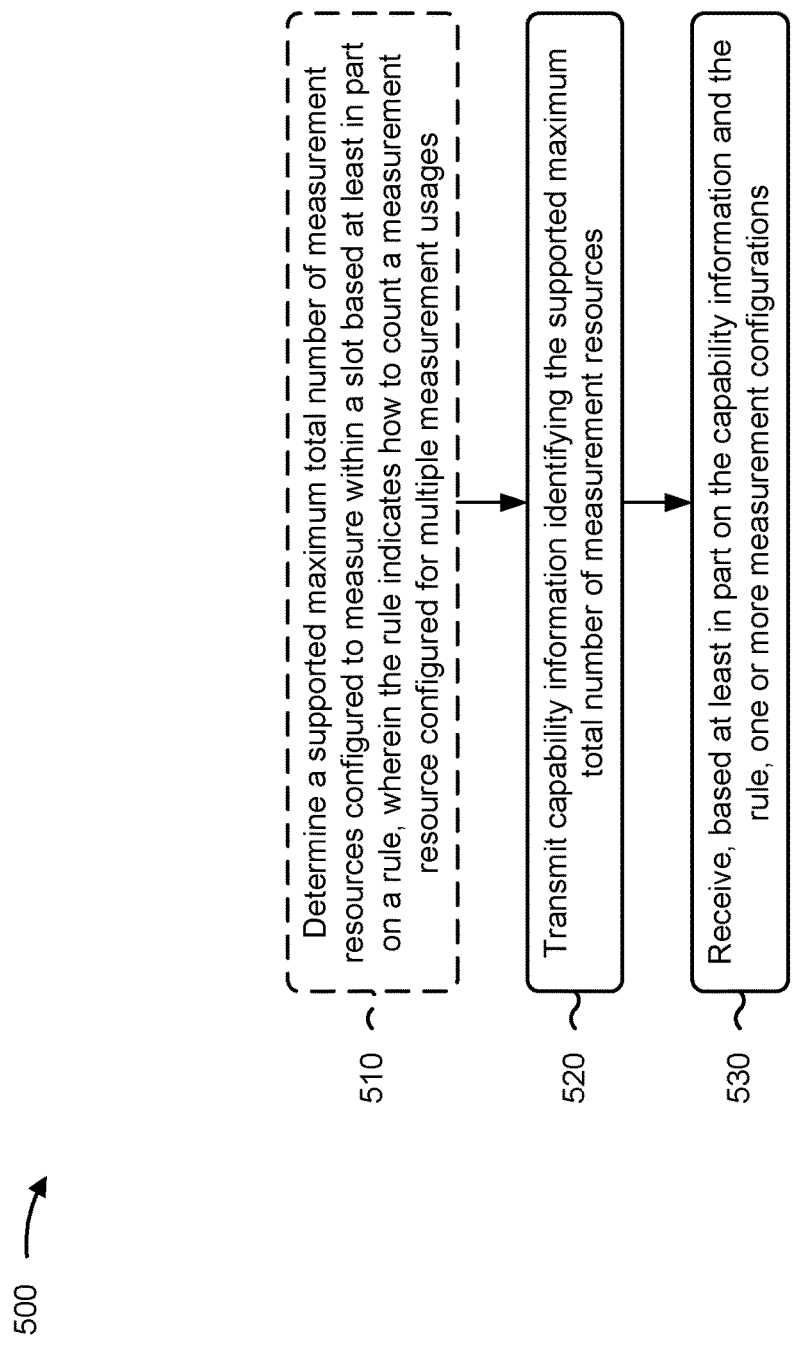
FIGS. 5 and 6 are diagrams illustrating example processes in accordance with the present disclosure.

FIG. 5 is a diagram illustrating an example process 500 performed, for example, by a UE, in accordance with the present disclosure. Example process 500 is an example where the UE (e.g., UE 120) performs operations associated with a resource counting rule for determining maximum measured reference signals.

As shown in FIG. 5, in some aspects, process 500 may optionally include determining a supported maximum total number of measurement resources configured to measure within a slot based at least in part on a rule, wherein the rule indicates how to count a measurement resource configured for multiple measurement usages (block 510). For example, the UE (e.g., using determination component 708, depicted in FIG. 7) may determine a supported maximum total number of measurement resources configured to measure within a slot based at least in part on a rule, wherein the rule indicates how to count a measurement resource configured for multiple measurement usages, as described above.

As further shown in FIG. 5, in some aspects, process 500 may include transmitting capability information identifying the supported maximum total number of measurement resources (block 520). For example, the UE (e.g., using transmission component 704, depicted in FIG. 7) may transmit capability information identifying the supported maximum total number of measurement resources, as described above.

As further shown in FIG. 5, in some aspects, process 500 may include receiving, based at least in part on the capability information and the rule, one or more measurement configurations (block 530). For example, the UE (e.g., using reception component 702, depicted in FIG. 7) may receive, based at least in part on the capability information and the rule, one or more measurement configurations, as described above.

Process 500 may include additional aspects, such as any single aspect or any combination of aspects described below and/or in connection with one or more other processes described elsewhere herein.

In a first aspect, the rule indicates to count the measurement resource once, irrespective of how many measurement usages are configured for the measurement resource.

In a second aspect, the rule indicates to count the measurement resource once per measurement usage configured for the measurement resource.

In a third aspect, the rule indicates to count the measurement resource once for all measurement usages that are not associated with a configured channel state information report setting, and once per measurement usage that is associated with a configured channel state information report setting.

In a fourth aspect, the rule indicates to count the measurement resource once per measurement usage that is not associated with a configured channel state information report setting, and once for all measurement usages that are associated with a configured channel state information report setting.

In a fifth aspect, alone or in combination with one or more of the first through fourth aspects, determining the supported maximum total number of measurement resources configured to measure within the slot further comprises determining the supported maximum total number of measurement resources configured to measure within the slot based at least in part on unique resource identifiers, wherein each of the measurement resources is associated with a unique resource identifier.

In a sixth aspect, alone or in combination with one or more of the first through fourth aspects, determining the supported maximum total number of measurement resources configured to measure within the slot further comprises determining the supported maximum total number of measurement resources configured to measure within the slot based at least in part on unique resource occurrences, wherein each of the measurement resources is associated with a unique resource occurrence.

In a seventh aspect, alone or in combination with one or more of the first through sixth aspects, a measurement usage, of the multiple measurement usages, comprises Layer 1 reference signal received power measurement, Layer 1 signal to interference plus noise measurement, pathloss measurement, beam failure detection, radio link monitoring, new beam identification, or some combination thereof.

In an eighth aspect, alone or in combination with one or more of the first through seventh aspects, the measurement resource comprises a synchronization signal block resource, a channel state information reference signal resource, a channel state information interference measurement resource, or some combination thereof.

In a ninth aspect, alone or in combination with one or more of the first through eighth aspects, determining the supported maximum total number of measurement resources configured to measure within the slot further comprises determining the supported maximum total number of measurement resources configured to measure within the slot across all component carriers in a frequency range usable by the UE.

In a tenth aspect, alone or in combination with one or more of the first through eighth aspects, determining the supported maximum total number of measurement resources configured to measure within the slot further comprises determining the supported maximum total number of measurement resources configured to measure within the slot across all component carriers in all frequency ranges usable by the UE.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
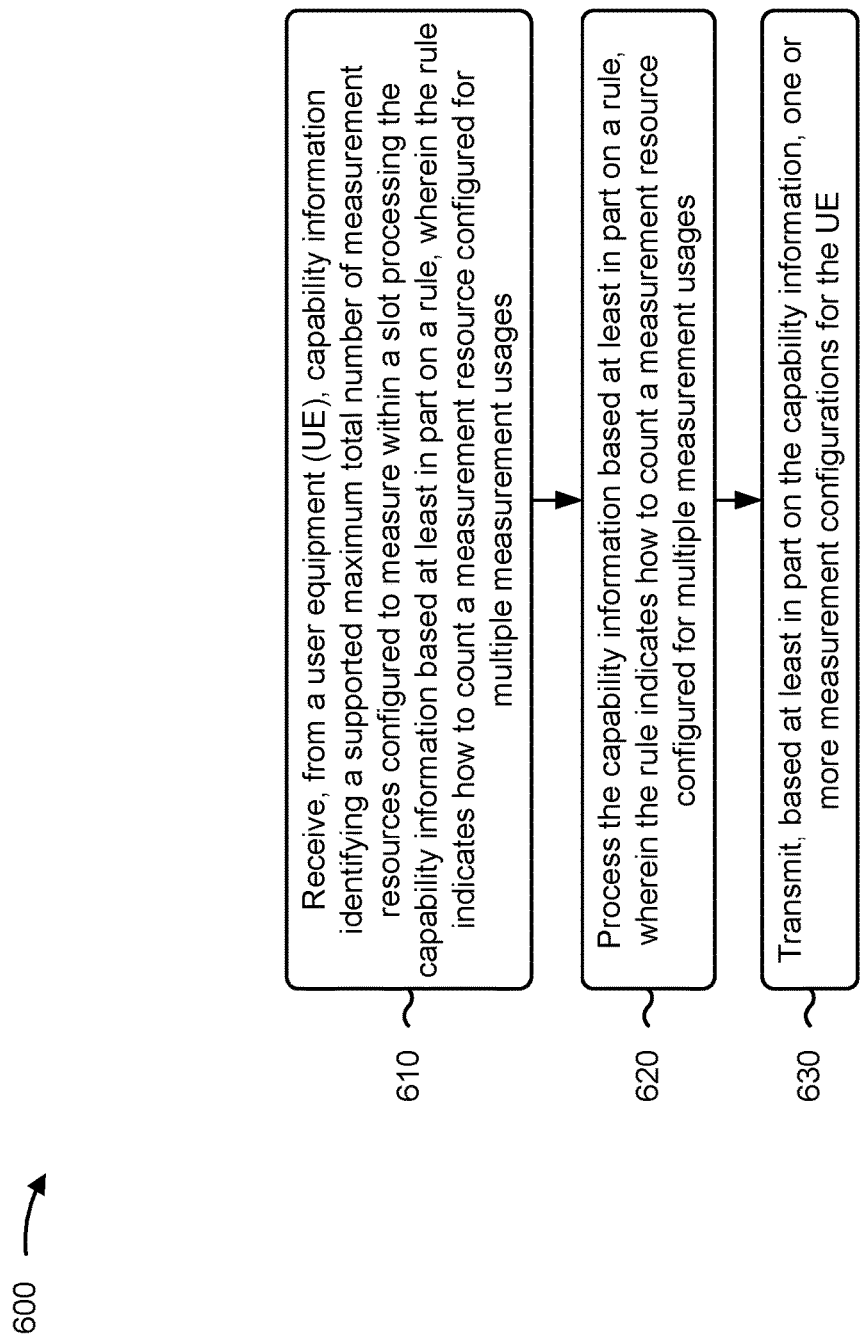

FIG. 6 is a diagram illustrating an example process 600 performed, for example, by a base station, in accordance with the present disclosure. Example process 600 is an example where the base station (e.g., base station 110) performs operations associated with resource counting rule for determining maximum measured reference signals.

As shown in FIG. 6, in some aspects, process 600 may include receiving, from a UE, capability information identifying a supported maximum total number of measurement resources configured to measure within a slot (block 610). For example, the base station (e.g., using reception component 802, depicted in FIG. 8) may receive, from a UE, capability information identifying a supported maximum total number of measurement resources configured to measure within a slot, as described above.

As further shown in FIG. 6, in some aspects, process 600 may optionally include processing the capability information based at least in part on a rule, wherein the rule indicates how to count a measurement resource configured for multiple measurement usages (block 620). For example, the base station (e.g., using processing component 808, depicted in FIG. 8) may process the capability information based at least in part on a rule, wherein the rule indicates how to count a measurement resource configured for multiple measurement usages, as described above.

As further shown in FIG. 6, in some aspects, process 600 may include transmitting, based at least in part on the capability information, one or more measurement configurations for the UE (block 630). For example, the base station (e.g., using transmission component 804, depicted in FIG. 8) may transmit, based at least in part on the capability information, one or more measurement configurations for the UE, as described above.

Process 600 may include additional aspects, such as any single aspect or any combination of aspects described below and/or in connection with one or more other processes described elsewhere herein.

In a first aspect, the rule indicates to count the measurement resource once, irrespective of how many measurement usages are configured for the measurement resource.

In a second aspect, the rule indicates to count the measurement resource once per measurement usage configured for the measurement resource.

In a third aspect, the rule indicates to count the measurement resource once for all measurement usages that are not associated with a configured channel state information report setting, and once per measurement usage that is associated with a configured channel state information report setting.

In a fourth aspect, the rule indicates to count the measurement resource once per measurement usage that is not associated with a configured channel state information report setting, and once for all measurement usages that are associated with a configured channel state information report setting.

In a fifth aspect, alone or in combination with one or more of the first through fourth aspects, the supported maximum total number of measurement resources configured to measure within the slot is based at least in part on unique resource identifiers, wherein each of the measurement resources is associated with a unique resource identifier.

In a sixth aspect, alone or in combination with one or more of the first through fourth aspects, the supported maximum total number of measurement resources configured to measure within the slot is based at least in part on unique resource occurrences, wherein each of the measurement resources is associated with a unique resource occurrence.

In a seventh aspect, alone or in combination with one or more of the first through sixth aspects, a measurement usage, of the multiple measurement usages, comprises Layer 1 reference signal received power measurement, Layer 1 signal to interference plus noise measurement, pathloss measurement, beam failure detection, radio link monitoring, new beam identification, or some combination thereof.

In an eighth aspect, alone or in combination with one or more of the first through seventh aspects, the measurement resource comprises a synchronization signal block resource, a channel state information reference signal resource, a channel state information interference measurement resource, or some combination thereof.

In a ninth aspect, alone or in combination with one or more of the first through eighth aspects, the supported maximum total number of measurement resources configured to measure within the slot is across all component carriers in a frequency range usable by the UE.

In a tenth aspect, alone or in combination with one or more of the first through eighth aspects, the supported maximum total number of measurement resources configured to measure within the slot is across all component carriers in all frequency ranges usable by the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
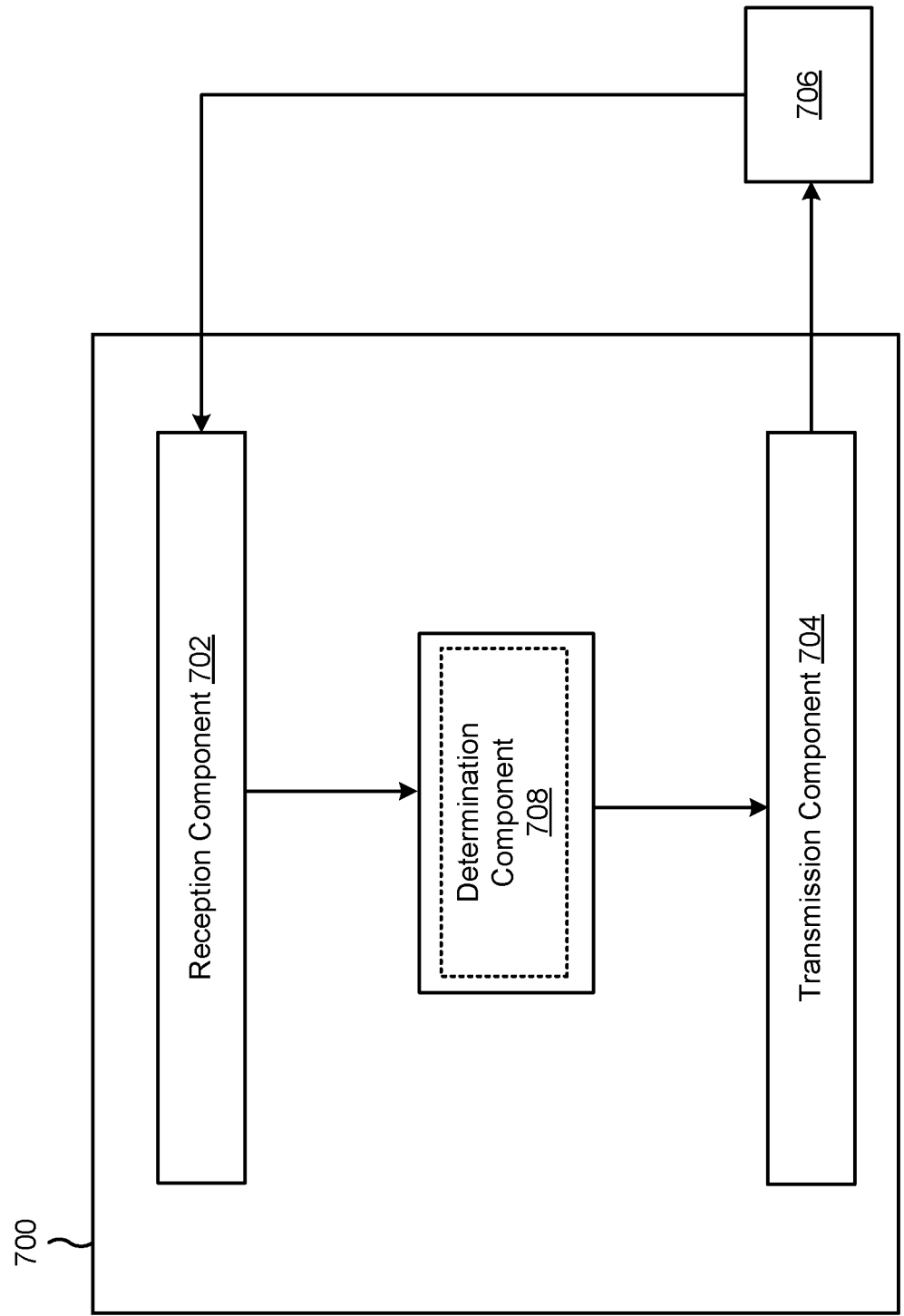
FIGS. 7 and 8 are block diagrams of example apparatuses for wireless communication in accordance with the present disclosure.

FIG. 7 is a block diagram of an example apparatus 700 for wireless communication in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a determination component 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine a supported maximum total number of measurement resources configured to measure within a slot based at least in part on a rule, wherein the rule indicates how to count a measurement resource configured for multiple measurement usages. The transmission component 704 may transmit capability information identifying the supported maximum total number of measurement resources. The reception component 702 may receive, based at least in part on the capability information and the rule, one or more measurement configurations.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
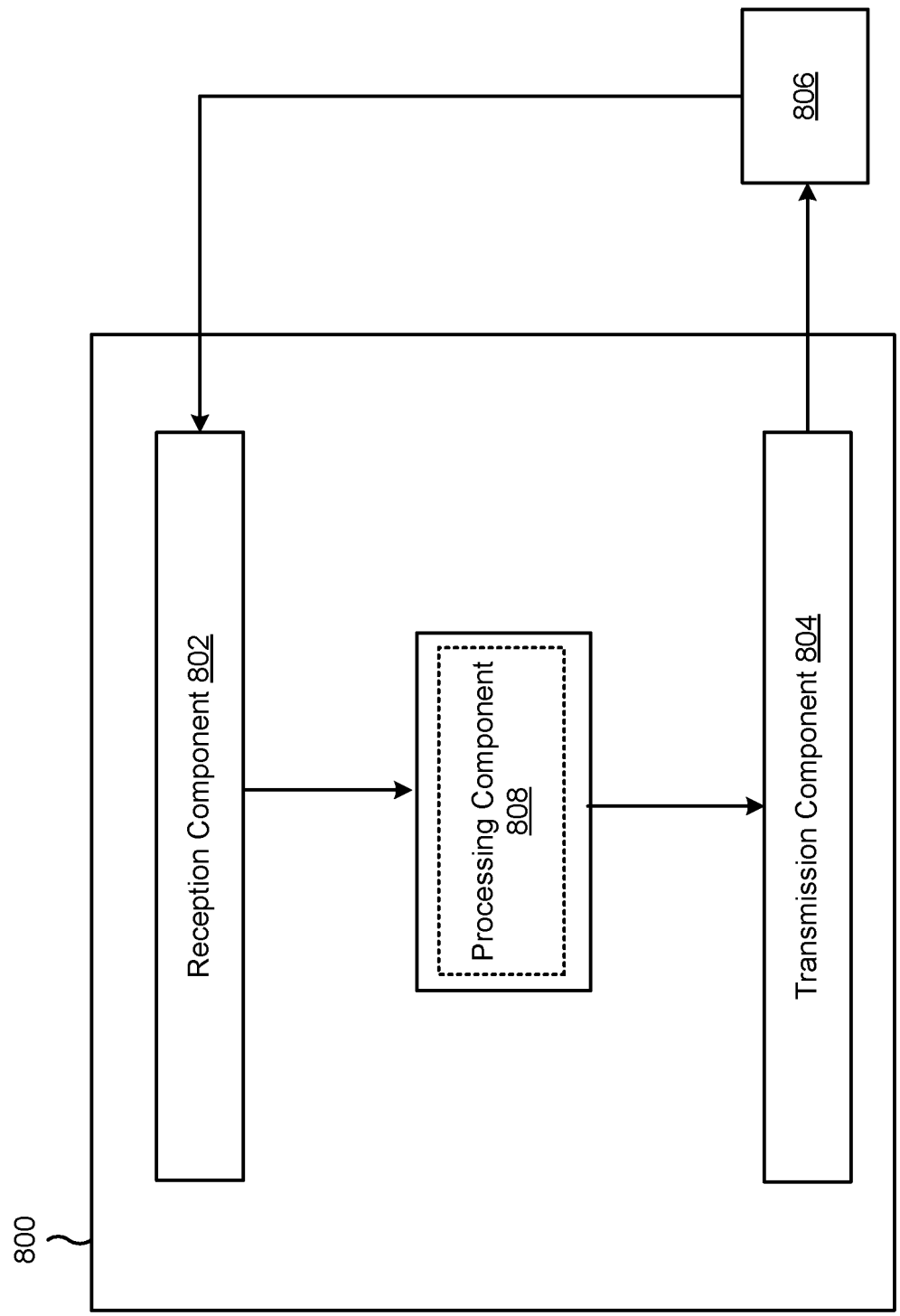

FIG. 8 is a block diagram of an example apparatus 800 for wireless communication in accordance with the present disclosure. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a processing component 808, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The reception component 802 may receive, from a UE, capability information identifying a supported maximum total number of measurement resources configured to measure within a slot processing the capability information based at least in part on a rule, wherein the rule indicates how to count a measurement resource configured for multiple measurement usages. The processing component 808 may process the capability information based at least in part on a rule, wherein the rule indicates how to count a measurement resource configured for multiple measurement usages The transmission component 804 may transmit, based at least in part on the capability information, one or more measurement configurations for the UE.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: transmitting capability information identifying a supported maximum total number of measurement resources configured to measure within a slot based at least in part on a rule, wherein the rule indicates how to count a measurement resource configured for multiple measurement usages; and receiving, based at least in part on the capability information and the rule, one or more measurement configurations.

Aspect 2: The method of Aspect 1, further comprising: determining the supported maximum total number of measurement resources configured to measure within a slot based at least in part on the rule.

Aspect 3: The method of any of Aspects 1-2, wherein the rule indicates to count the measurement resource once for all measurement usages configured for the measurement resource.

Aspect 4: The method of any of Aspects 1-3, wherein the rule indicates to count the measurement resource once per measurement usage configured for the measurement resource.

Aspect 5: The method of any of Aspects 1-4, wherein the rule indicates to count the measurement resource once for all measurement usages that are not associated with a configured channel state information report setting, and once per measurement usage that is associated with a configured channel state information report setting.

Aspect 6: The method of any of Aspects 1-5, wherein the rule indicates to count the measurement resource once per measurement usage that is not associated with a configured channel state information report setting, and once for all measurement usages that are associated with a configured channel state information report setting.

Aspect 7: The method of any of Aspects 1-6, wherein the rule indicates to count the measurement resource once for a first set of measurement usages configured for the measurement resource, and once for each measurement usage of a second set of measurement usages configured for the measurement resource.

Aspect 8: The method of any of Aspects 1-7, wherein the rule indicates to count the measurement resource once for a first set of measurement usages configured for the measurement resource, and once for a second set of measurement usages configured for the measurement resource.

Aspect 9: The method of any of Aspects 1-8, wherein the supported maximum total number of measurement resources configured to measure within the slot is based at least in part on unique resource identifiers, wherein each of the measurement resources is associated with a unique resource identifier.

Aspect 10: The method of any of Aspects 1-9, wherein the supported maximum total number of measurement resources configured to measure within the slot is based at least in part on unique resource occurrences, wherein each of the measurement resources is associated with a unique resource occurrence.

Aspect 11: The method of any of Aspects 1-10, wherein a measurement usage, of the multiple measurement usages, comprises: Layer 1 reference signal received power measurement, Layer 1 signal to interference plus noise measurement, pathloss measurement, beam failure detection, radio link monitoring, new beam identification, or some combination thereof.

Aspect 12: The method of any of Aspects 1-11, wherein the measurement resource comprises: a synchronization signal block resource, a channel state information reference signal resource, a channel state information interference measurement resource, or some combination thereof.

Aspect 13: The method of any of Aspects 1-12, wherein the supported maximum total number of measurement resources configured to measure within the slot is across all component carriers in a frequency range usable by the UE.

Aspect 14: The method of any of Aspects 1-13, wherein the supported maximum total number of measurement resources configured to measure within the slot is across all component carriers in all frequency ranges usable by the UE.

Aspect 15: A method of wireless communication performed by a base station, comprising: receiving, from a user equipment (UE), capability information identifying a supported maximum total number of measurement resources configured to measure within a slot; and transmitting, based at least in part on a rule and the capability information, one or more measurement configurations for the UE, wherein the rule indicates how to count a measurement resource configured for multiple measurement usages.

Aspect 16: The method of Aspect 15, wherein the rule indicates to count the measurement resource once, irrespective of how many measurement usages are configured for the measurement resource.

Aspect 17: The method of any of Aspects 15-16, wherein the rule indicates to count the measurement resource once per measurement usage configured for the measurement resource.

Aspect 18: The method of any of Aspects 15-17, wherein the rule indicates to count the measurement resource once for all measurement usages that are not associated with a configured channel state information report setting, and once per measurement usage that is associated with a configured channel state information report setting.

Aspect 19: The method of any of Aspects 15-18, wherein the rule indicates to count the measurement resource once per measurement usage that is not associated with a configured channel state information report setting, and once for all measurement usages that are associated with a configured channel state information report setting.

Aspect 20: The method of any of Aspects 15-19, wherein the supported maximum total number of measurement resources configured to measure within the slot is based at least in part on unique resource identifiers, wherein each of the measurement resources is associated with a unique resource identifier.

Aspect 21: The method of any of Aspects 15-20, wherein the supported maximum total number of measurement resources configured to measure within the slot is based at least in part on unique resource occurrences, wherein each of the measurement resources is associated with a unique resource occurrence.

Aspect 22: The method of any of Aspects 15-21, wherein a measurement usage, of the multiple measurement usages, comprises: Layer 1 reference signal received power measurement, Layer 1 signal to interference plus noise measurement, pathloss measurement, beam failure detection, radio link monitoring, new beam identification, or some combination thereof.

Aspect 23: The method of any of Aspects 15-22, wherein the measurement resource comprises: a synchronization signal block resource, a channel state information reference signal resource, a channel state information interference measurement resource, or some combination thereof.

Aspect 24: The method of any of Aspects 15-23, wherein the supported maximum total number of measurement resources configured to measure within the slot is across all component carriers in a frequency range usable by the UE.

Aspect 25: The method of any of Aspects 15-24, wherein the supported maximum total number of measurement resources configured to measure within the slot is across all component carriers in all frequency ranges usable by the UE.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit capability information identifying a supported maximum total number of measurement resources configured to measure within a slot based at least in part on a rule, wherein the rule indicates how to count a measurement resource configured for multiple measurement usages, and wherein the rule indicates to:
         count the measurement resource for a first set of measurement usages that include beam failure detection (BFD) and radio link management (RLM), and
         count the measurement resource for a second set of measurement usages that include layer 1 reference signal received power (L1-RSRP) and layer 1 signal to interference plus noise ratio (L1-SINR); and
      receive, based at least in part on the capability information and the rule, one or more measurement configurations.

2. The UE of claim 1, wherein the one or more processors are further configured to:
   determine the supported maximum total number of measurement resources configured to measure within the slot based at least in part on the rule.

3. The UE of claim 1, wherein the rule indicates to count the measurement resource once for all measurement usages that are not associated with a configured channel state information report setting, and once per measurement usage that is associated with the configured channel state information report setting.

4. The UE of claim 1, wherein the rule indicates to count the measurement resource once per measurement usage that is not associated with a configured channel state information report setting, and once for all measurement usages that are associated with the configured channel state information report setting.

5. The UE of claim 1, wherein the rule indicates to count the measurement resource once for the first set of measurement usages configured for the measurement resource, and once for each measurement usage of the second set of measurement usages configured for the measurement resource.

6. The UE of claim 1, wherein the rule indicates to count the measurement resource once for the first set of measurement usages configured for the measurement resource, and once for the second set of measurement usages configured for the measurement resource.

7. The UE of claim 1, wherein the supported maximum total number of measurement resources configured to measure within the slot is based at least in part on unique resource identifiers, wherein each of the measurement resources is associated with a unique resource identifier.

8. The UE of claim 1, wherein the supported maximum total number of measurement resources configured to measure within the slot is based at least in part on unique resource occurrences, wherein each of the measurement resources is associated with a unique resource occurrence.

9. The UE of claim 1, wherein a measurement usage, of the multiple measurement usages, comprises:
L1-RSRP measurement,
L1-SINR measurement,
pathloss measurement,
BFD,
RLM,
new beam identification, or
some combination thereof.

10. The UE of claim 1, wherein the measurement resource comprises:
a synchronization signal block resource,
a channel state information reference signal resource,
a channel state information interference measurement resource, or
some combination thereof.

11. The UE of claim 1, wherein the supported maximum total number of measurement resources configured to measure within the slot is across all component carriers in a frequency range usable by the UE.

12. The UE of claim 1, wherein the supported maximum total number of measurement resources configured to measure within the slot is across all component carriers in all frequency ranges usable by the UE.

13. A base station for wireless communication, comprising:
one or more memories; and
one or more processors, coupled to the one or more memories, configured to:
receive, from a user equipment (UE), capability information identifying a supported maximum total number of measurement resources configured to measure within a slot; and
transmit, based at least in part on a rule and the capability information, one or more measurement configurations for the UE, wherein the rule indicates how to count a measurement resource configured for multiple measurement usages, and wherein the rule indicates to:
count the measurement resource for a first set of measurement usages that include beam failure detection (BFD) and radio link management (RLM), and
count the measurement resource for a second set of measurement usages that include layer 1 reference signal received power (L1-RSRP) and layer 1 signal to interference plus noise ratio (L1-SINR).

14. The base station of claim 13, wherein the rule indicates to count the measurement resource once for all measurement usages that are not associated with a configured channel state information report setting, and once per measurement usage that is associated with the configured channel state information report setting.

15. The base station of claim 13, wherein the rule indicates to count the measurement resource once per measurement usage that is not associated with a configured channel state information report setting, and once for all measurement usages that are associated with the configured channel state information report setting.

16. The base station of claim 13, wherein the supported maximum total number of measurement resources configured to measure within the slot is based at least in part on unique resource identifiers, wherein each of the measurement resources is associated with a unique resource identifier.

17. The base station of claim 13, wherein the supported maximum total number of measurement resources configured to measure within the slot is based at least in part on unique resource occurrences, wherein each of the measurement resources is associated with a unique resource occurrence.

18. The base station of claim 13, wherein a measurement usage, of the multiple measurement usages, comprises:
L1-RSRP measurement,
L1-SINR measurement,
pathloss measurement,
BFD,
RLM,
new beam identification, or
some combination thereof.

19. The base station of claim 13, wherein the measurement resource comprises:
a synchronization signal block resource,
a channel state information reference signal resource,
a channel state information interference measurement resource, or
some combination thereof.

20. The base station of claim 13, wherein the supported maximum total number of measurement resources configured to measure within the slot is across all component carriers in a frequency range usable by the UE.

21. The base station of claim 13, wherein the supported maximum total number of measurement resources configured to measure within the slot is across all component carriers in all frequency ranges usable by the UE.

22. The base station of claim 13, wherein the rule indicates to count the measurement resource once for the first set of measurement usages configured for the measurement resource, and once for each measurement usage of the second set of measurement usages configured for the measurement resource.

23. The base station of claim 13, wherein the rule indicates to count the measurement resource once for the first set of measurement usages configured for the measurement resource, and once for the second set of measurement usages configured for the measurement resource.

24. A method of wireless communication performed by a user equipment (UE), comprising:
transmitting capability information identifying a supported maximum total number of measurement resources configured to measure within a slot based at least in part on a rule, wherein the rule indicates how to count a measurement resource configured for multiple measurement usages, and wherein the rule indicates to:
  count the measurement resource for a first set of measurement usages that include beam failure detection (BFD) and radio link management (RLM), and
  count the measurement resource for a second set of measurement usages that include layer 1 reference signal received power (L1-RSRP) and layer 1 signal to interference plus noise ratio (L1-SINR); and
receiving, based at least in part on the capability information and the rule, one or more measurement configurations.

25. The method of claim 24, further comprising:
determining the supported maximum total number of measurement resources configured to measure within the slot based at least in part on the rule.

26. The method of claim 24, wherein the rule indicates to count the measurement resource once for the first set of measurement usages configured for the measurement resource, and once for each measurement usage of the second set of measurement usages configured for the measurement resource.

27. The method of claim 24, wherein the rule indicates to count the measurement resource once for the first set of measurement usages configured for the measurement resource, and once for the second set of measurement usages configured for the measurement resource.

28. A method of wireless communication performed by a base station, comprising:
receiving, from a user equipment (UE), capability information identifying a supported maximum total number of measurement resources configured to measure within a slot; and
transmitting, based at least in part on a rule and the capability information, one or more measurement configurations for the UE, wherein the rule indicates how to count a measurement resource configured for multiple measurement usages, and wherein the rule indicates to:
  count the measurement resource for a first set of measurement usages that include beam failure detection (BFD) and radio link management (RLM), and
  count the measurement resource for a second set of measurement usages that include layer 1 reference signal received power (L1-RSRP) and layer 1 signal to interference plus noise ratio (L1-SINR).

29. The method of claim 28, wherein the rule indicates to count the measurement resource once for the first set of measurement usages configured for the measurement resource, and once for each measurement usage of the second set of measurement usages configured for the measurement resource.

30. The method of claim 28, wherein the rule indicates to count the measurement resource once for the first set of measurement usages configured for the measurement resource, and once for the second set of measurement usages configured for the measurement resource.

* * * * *